(No Model.) 3 Sheets—Sheet 1.
J. H. VAILE & D. A. TOMPKINS.
COMBINED COOKER AND CAKE FORMER FOR OIL MEAL.
No. 421,454. Patented Feb. 18, 1890.
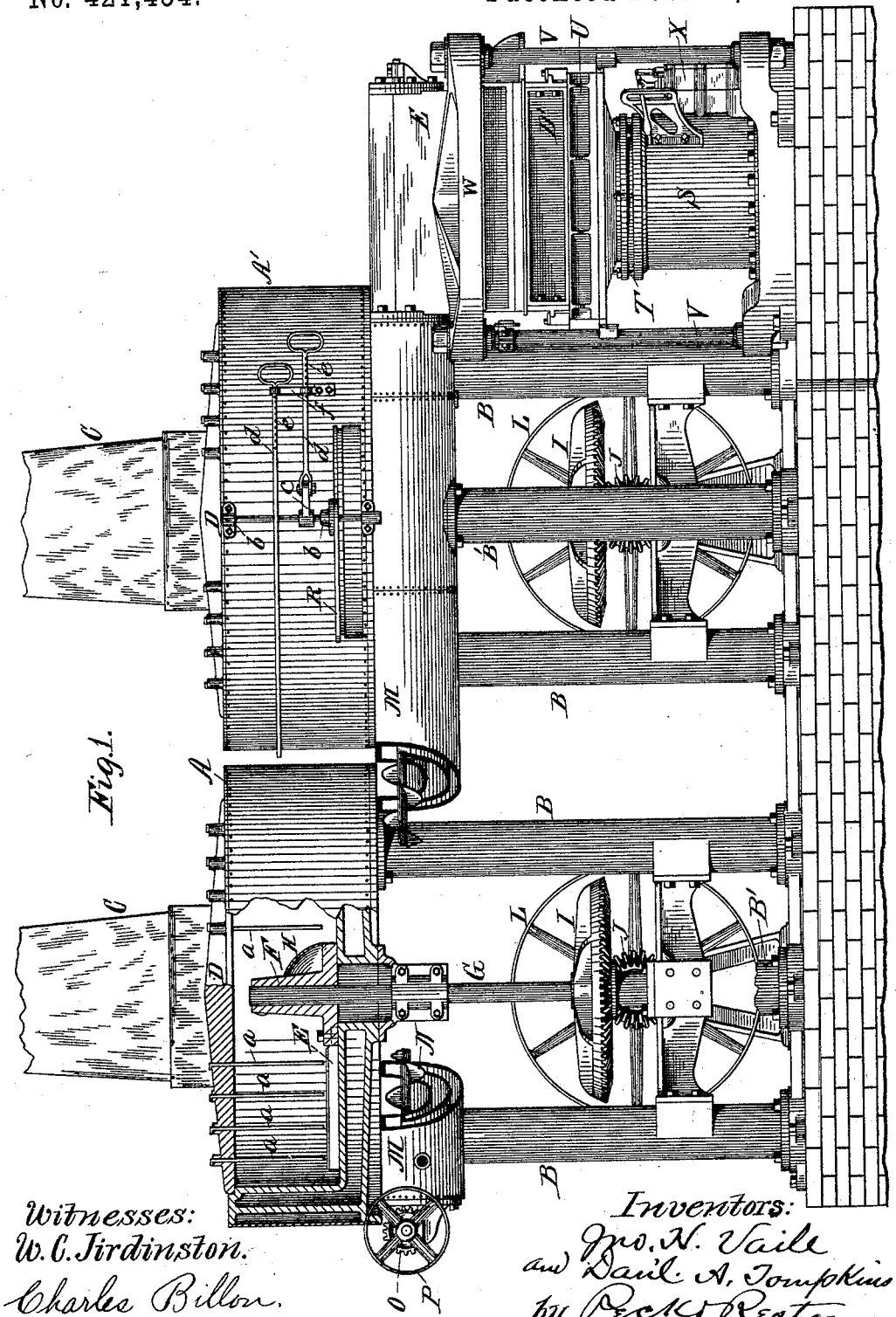
Witnesses:
W. C. Jirdinston.
Charles Billon.
Inventors:
Jno. H. Vaile
and Dan'l A. Tompkins
by Peck & Rector
their Attorneys.

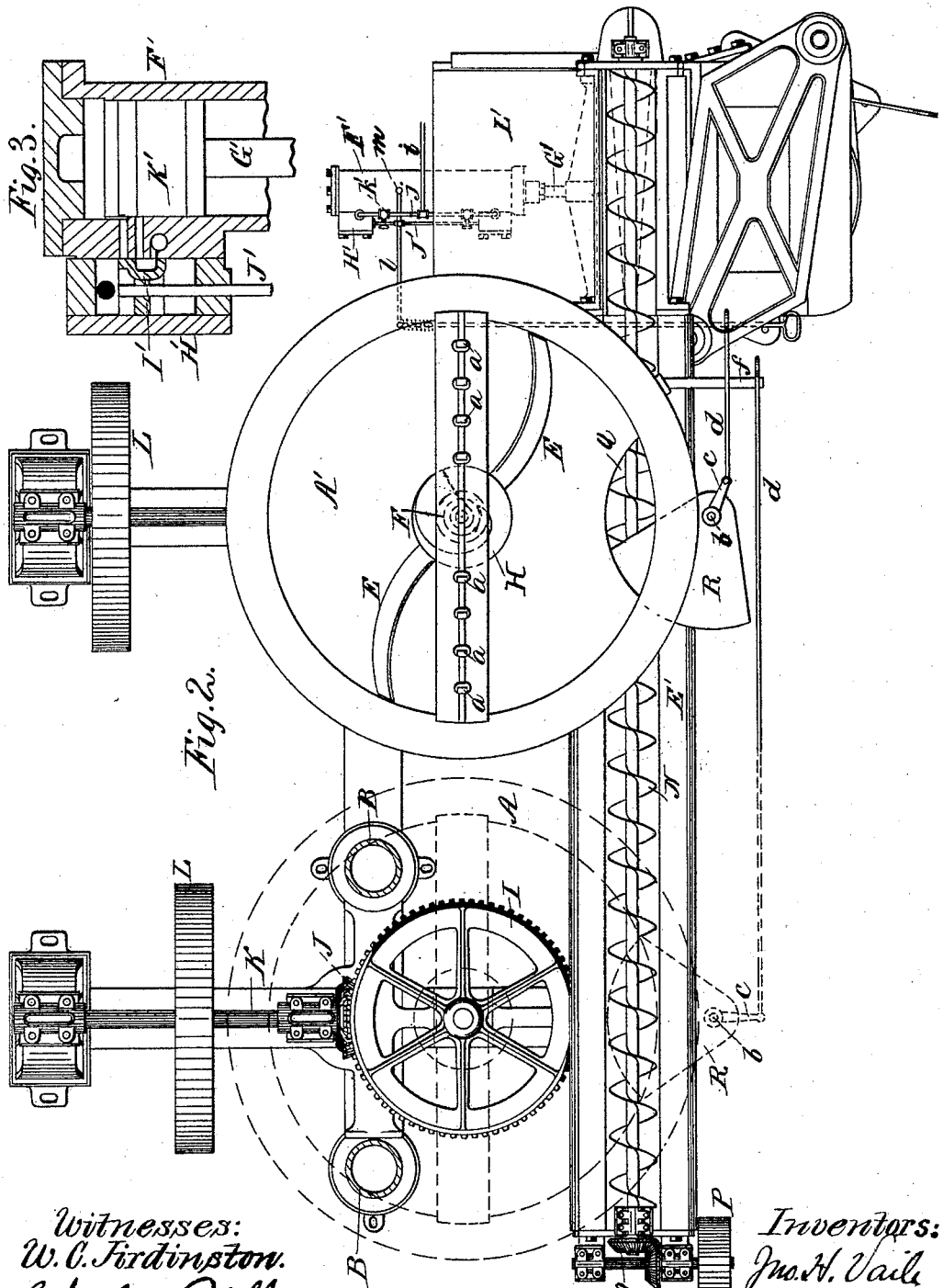

(No Model.) 3 Sheets—Sheet 3.
J. H. VAILE & D. A. TOMPKINS.
COMBINED COOKER AND CAKE FORMER FOR OIL MEAL.
No. 421,454. Patented Feb. 18, 1890.
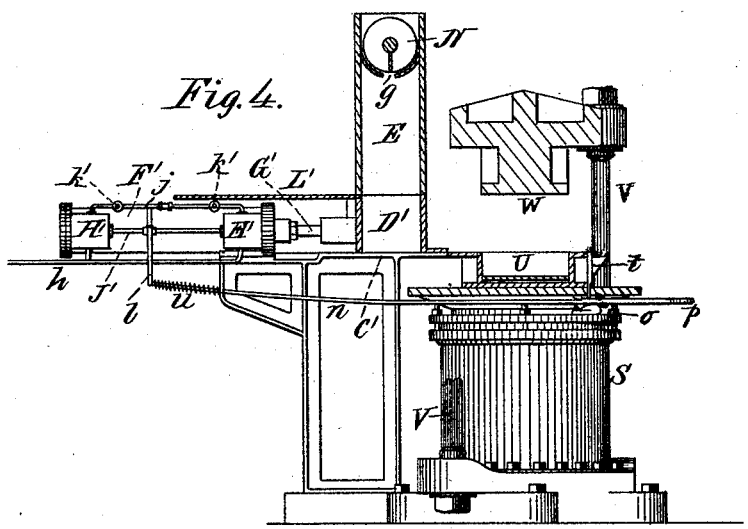
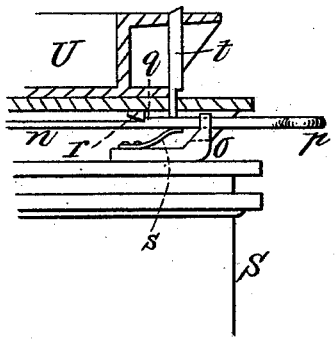
Witnesses:
W. C. Jirdinston.
Charles Billon
Inventors:
Jno. N. Vaile
and Dan'l A. Tompkins
by Peck & Rector
their Attorneys.

UNITED STATES PATENT OFFICE.

JOHN H. VAILE, OF DAYTON, OHIO, AND DANIEL A. TOMPKINS, OF CHARLOTTE, NORTH CAROLINA.

COMBINED COOKER AND CAKE-FORMER FOR OIL-MEAL.

SPECIFICATION forming part of Letters Patent No. 421,454, dated February 18, 1890.

Application filed July 24, 1889. Serial No. 318,540. (No model.)

*To all whom it may concern:*

Be it known that we, JOHN H. VAILE, of Dayton, in the county of Montgomery, State of Ohio, and DANIEL A. TOMPKINS, of Charlotte, county of Mecklenburg, State of North Carolina, both citizens of the United States, have jointly invented certain new and useful Improvements in a Combined Cooker and Cake-Former for Oil-Meal, of which the following is a full, clear, and exact description, reference being had to the accompanying drawings, forming part of this specification.

Our invention relates to that class of cookers and combined cake-formers for cooking the oil-meal and forming it into cakes ready to be inserted into the press for the extraction of the oil; and it has for its object the provision of novel means by which the cooking is rendered perfect and continuous and the delivery of the cooked meal to the cake-former and the forming of the cakes rendered rapid and as nearly automatic as possible.

The novelty of our invention will be herewith set forth, and specifically pointed out in the claims.

In the accompanying drawings, Figure 1, Sheet 1, is a side elevation, partly in section, of a combined cooker and cake-former embodying our invention. Fig. 2, Sheet 2, is a plan view of the same with one of the cookers removed, but its position indicated in broken lines. Fig. 3, Sheet 2, is an enlarged section through one end of the cylinder and steam-chest. Fig. 4, Sheet 3, is an end elevation, partly in section, of the cake-former and connected parts. Fig. 5, Sheet 3, is an enlarged sectional detail of the automatic tripping mechanism.

The same letters of reference are used to indicate identical parts in all the figures.

With the exceptions to be pointed out, the cookers A A', in sets of two or more and supported in any suitable manner, as upon uprights B, are of the usual construction and are steam-jacketed cylindrical vessels, into which the charges of oleaginous meal are conducted through hopper-spouts C, or in any other suitable manner.

Depending from cross-pieces D are the usual break blades or knives $a$, beneath which, on the bottom of the cookers, revolve the stirrer-arms E, in this instance secured to a flanged hub F, fastened upon a vertical shaft G, suitably journaled and extending centrally through the bottom of the cooker, and having secured to or formed integral with it a spiral blade H, curved in cross-section, as seen in Fig. 1, whose bottom edge rests upon the bottom of the cooker and serves to plow up the meal adjacent to the hub and to turn it over and outward away from the hub, thereby preventing the meal around the hub from lying in a thin lever, and thereby rendering the thickness of the meal uniform in the cooker, so as to secure the best and most uniform results in cooking. Upon the bottom of each shaft G is a beveled gear I, with which meshes a smaller beveled gear J upon the end of a suitably-journaled horizontal shaft K, having secured thereon a driving-pulley L.

Journaled in a horizontal trough M, preferably steam-jacketed and supported under the edge of the cookers A A', as upon uprights B', is a spiral conveyer N, driven in any suitable manner, as by the beveled pinions O and driving-pulley P, Fig. 2. An opening Q is formed in the bottom of each cooker over the conveyer-trough, and is controlled by a swinging gate or slide R, pivoted, as at $b$, and operated by a crank $c$ and handle $d$, extending to the cake-former, so as to be under the control of the operator at that point. One cooker is employed, cooking its charge while the previously-cooked charge in the other cooker is being deposited in the conveyer-trough and carried by the conveyer to the cake-former, thus making the operation continuous, for the operator can so adjust the gate R by the notched handle $d$ as to convey the meal to the former as fast as the operator desires to work it, or by adjusting the gate $d$ he can so time the arrival of the meal to the former and the working of the former to each other as to prevent choking in the conveyer. After closing the gate of the emptied cooker it is recharged and the gate of the other cooker is opened, and so on without loss of time. The handles $d$ may be notched, as at $e$, Fig. 1, to engage with guide-stops $f$ to hold the gates locked in any of their adjusted positions.

The cake-former, of the usual or any suitable construction, except as herein pointed out, is located at the discharge end of the conveyer N and under the edge of the last cooker. It consists of the cylinder S, with a piston T, carrying the forming-box U, guided between the uprights V, supporting the stationary pressing head or platen W.

X is the valve mechanism for operating the piston to raise and lower the forming-box.

By the side of the forming-box U and flush with its top edge when down is a table or platform C', Fig. 4, upon which is guided a rectangular feed-box D', open at its bottom and top, of a width corresponding to the length of the box U, and of sufficient size to hold a charge of meal for the box U. This box D' when back to its farthest limit registers with the open bottom of a box E', extending down from the projected end of the conveyer-trough, whose bottom has an opening $g$, preferably V-shaped, as shown by the dotted lines, Fig. 2, to permit passage of the meal from the conveyer-trough into the box E', and thence into the box D'.

To operate the box D' to cause it to slide over the box U and deposit therein its charge of meal, and then slide back to receive a new charge, we provide a steam-cylinder F', secured upon the table C' and having a piston-rod G' secured to the rear side of the box D' at its middle. There are preferably two steam-chests H', one at each end of the cylinder F', the slide-valves I' of which, Fig. 3, are alike in construction and are connected by a single valve-rod J'.

The construction of the piston K' and arrangement of the slide-valves and ports is the same as in ordinary cylinders, except that the piston before reaching the end of its stroke each way cuts off the exhaust and cushions on steam.

The live steam enters the steam-chests through the pipe $h$, Fig. 4, and the exhaust goes out through the pipe $i$, Fig. 2, having a branch $j$ to each steam-chest, in which is interposed a valve $k'$ $k'$ to regulate the speed of the feed-box D' in either direction by throttling the exhaust. For instance, it will be found desirable to have the feed-box travel forward rapidly to deposit its charge and then return slowly to even off the top of the box U. To accomplish this it is only necessary to partially close the valve $k'$, thereby retarding the exhaust on the return-stroke of the piston and feed-box, as will be readily understood.

Pivoted to a valve-rod J' is a lever-arm $l$, Figs. 2 and 4, which is in turn pivoted to the cylinder, as at $m$. Pivoted to the free end of the lever $l$ is a rod $n$, extending forward to the front of the cylinder S, guided in the cylinder-bracket and in a vertically-slotted lug $o$, Fig. 5, and terminating in a handle $p$. When the box U is down, a shoulder $q$ upon the rod engages with a stop $r$ upon the under side of the box U, and a spring $s$ holds the rod $n$ up. Guided in the flanged top of the box U is a vertical tripping-rod $t$, with a beveled upper end, and whose lower end rests upon the rod $n$. Surrounding the rod $n$ at any point, so as to be put under tension when the handle $p$ is grasped and the rod $n$ drawn forward to cause its shoulder $q$ to become locked to the stop $r$, is a coiled spring $u$, and this drawing forward of the rod $n$ shifts the valves to admit steam to the rear end of the piston K' and starts the box D' forward with its charge to be deposited in the box U. As soon as the front end of the box D' has passed over the box U it strikes and presses down the rod $t$, thereby forcing down the rod $n$ and disengaging the shoulder $q$ and stop $r$, whereupon the spring $u$ draws back the rod $n$, and, through the medium of the lever $l$, reshifts the valves to reverse the motion of the piston and draw back the box D'.

To prevent the escape of the meal from the box E when the box D' is going forward to deposit its charge, a slide L', suitably guided, is secured to the rear top edge of the box D', which acts as a cut-off valve to the box E' when drawn forward by the travel of the box D', as will be readily understood.

The operation of folding in and pressing the cake is well known and need not be described.

Having thus fully described our invention, we claim—

1. The combination, with a forming-press having a horizontally-sliding feed-box for depositing the meal in the forming-box and one or more cookers, of a conveyer extending from said cooker or cookers and discharging into a box with which said sliding feed-box registers, and a cut-off slide for said last-named box carried by said feed-box, substantially as described.

2. The combination, with a forming-press having a horizontally-sliding feed-box for depositing the meal in the forming-box, of one or more cookers with discharge-openings having gates R and operating-handles $d$, and a conveyer for delivering the meal to the feed-box, substantially as described.

3. The combination, with a forming-press, of a feed-box actuated by a piston-rod and piston inclosed in a cylinder, substantially as described.

4. The combination, with a forming-press, of a feed-box actuated by a piston and piston-rod inclosed in a cylinder and automatic tripping mechanism actuated at the end of the forward stroke of the box to cause its backward travel, substantially as described.

5. The combination, with a forming-press, of a feed-box actuated by a piston-rod and piston inclosed in a cylinder having separate steam and exhaust ports, the exhaust being provided with a valve by which the motion of the piston may be controlled.

6. The combination, with a forming-press having a sliding feed-box actuated by a piston-rod and piston inclosed in a cylinder provided with two chests and valves, of an exhaust-pipe for each steam-chest, provided with a valve, whereby the exhaust can be throttled to regulate the speed of the feed-box in either direction, substantially as described.

7. The combination, with a forming-press having a sliding feed-box actuated by a piston-rod and piston inclosed in a cylinder provided with two steam chests and valves, of an operating-handle for said valves, a retracting-spring for said handle, and a trip-latch to release said handle and actuated by said feed-box to reverse the valves and make its back-stroke, substantially as described.

8. The combination, with a cooking-vessel, of a central revolving hub therein, provided with a spiral or volute turning-blade H and with the stirring-blades E, said blades H and E being at or near the bottom of said vessel and rotating with said hub, substantially as set forth.

9. The combination and arrangement of the cookers A A', conveyer-trough M, with its conveyer N, box E', with an opening to receive the meal from the conveyer, sliding feed-box D', provided with the cut-off L', and the forming-press with its box U, substantially as and for the purpose described.

10. The combination and arrangement of the box U, tripping-rod $t$, handle $n$, with its shoulder $q$, stop $r$, lug $o$, springs $s$ and $u$, lever $l$, valve-rod J', steam-cylinder F, with its valves and steam-chests, piston-rod G', and sliding feed-box D', substantially as and for the purpose described.

JOHN H. VAILE.
DANIEL A. TOMPKINS.

Witnesses as to John H. Vaile:
GEO. B. SMITH,
JOHN E. TRONE.

Witnesses as to Daniel A. Tompkins:
CHAS. M. PECK,
EDWARD RECTOR.